United States Patent [19]

Itou et al.

[11] Patent Number: 4,868,702
[45] Date of Patent: Sep. 19, 1989

[54] GROUND CIRCUIT APPARATUS FOR ELECTRONIC EQUIPMENT

[75] Inventors: Yuuzi Itou, Fukaya; Hiroaki Unno, Ichikawa, both of Japan

[73] Assignee: Kabushiki Kaisha Toshiba, Kawasaki, Japan

[21] Appl. No.: 298,907

[22] Filed: Jan. 19, 1989

[30] Foreign Application Priority Data

Jan. 22, 1988 [JP] Japan .................................. 63-10811

[51] Int. Cl.⁴ .............................................. H02H 3/00
[52] U.S. Cl. ..................................... 361/42; 324/510; 324/511; 361/41
[58] Field of Search ..................... 361/42, 41; 324/509, 324/510, 511

[56] References Cited

U.S. PATENT DOCUMENTS 4,630,161 12/1986 Seitz ...................................... 361/42
4,639,611  1/1987 Sticher ............................... 361/42 X
4,722,021  1/1988 Hornung et al. .................. 361/42 X

FOREIGN PATENT DOCUMENTS 13099 7/1980 European Pat. Off. .
54642 6/1982 European Pat. Off. .

Primary Examiner—Derek S. Jennings
Attorney, Agent, or Firm—Cushman, Darby & Cushman

[57] ABSTRACT

In a ground circuit apparatus for electronic equipment according to this invention, a motor driving circuit group constituted of a drum motor, a loading motor and a capstan motor is connected with a DC power source through a power source line and a ground line to have power supplied therefrom. A signal processing circuit group constituted of a camera circuit, a logic circuit, servo circuit, video circuit and an audio circuit as well as an electronic view finder is connected with the DC power source through the power line and a ground line. A video circuit of the signal processing circuit group is connected through a ground line to a chassis which serves as a reference potential point. In addition, two diodes connected in parallel and directed in mutually opposite directions to have opposite polarities and a ground line are connected between the electronic view finder and the chassis.

5 Claims, 3 Drawing Sheets

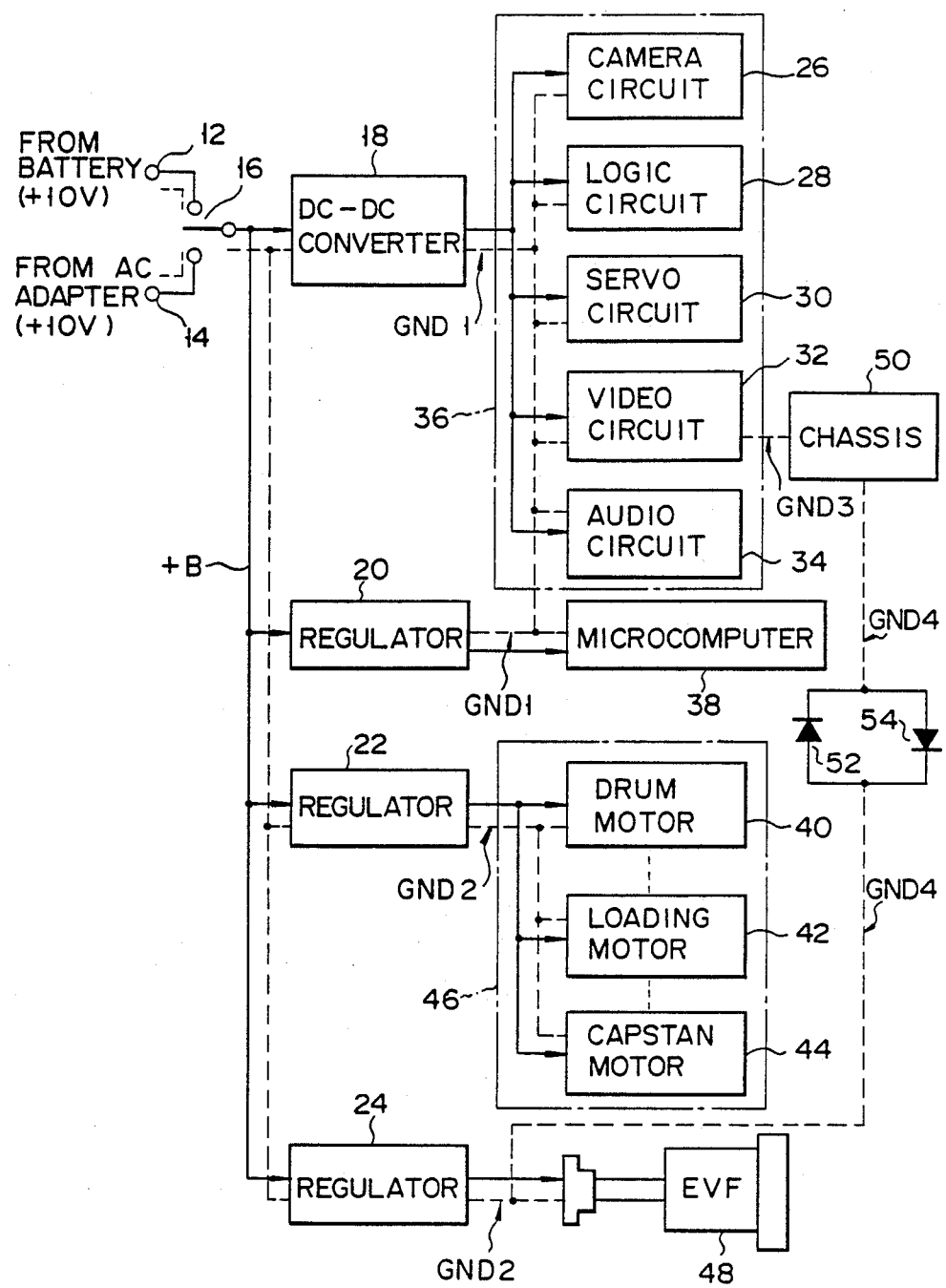
F I G. 2

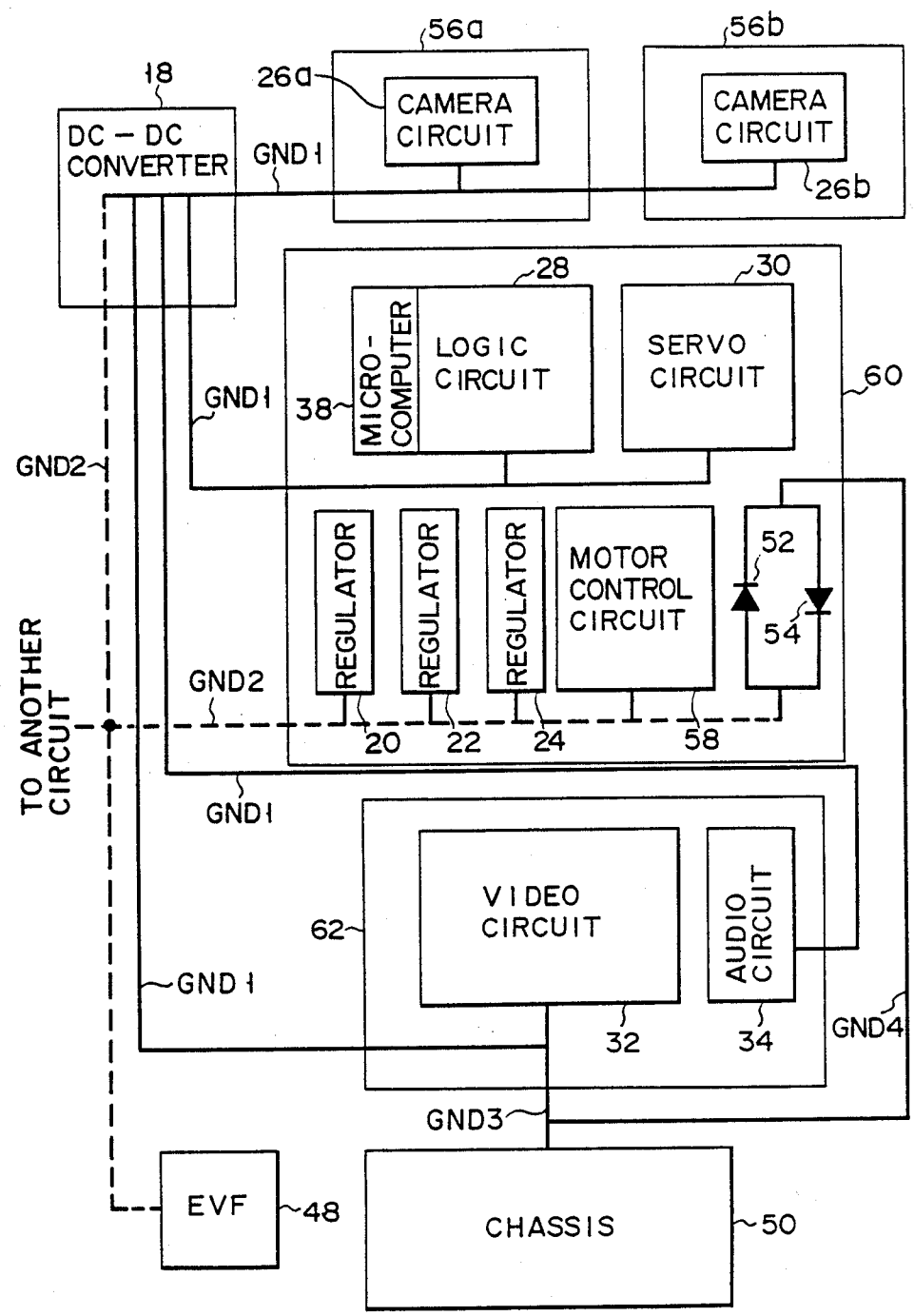
F I G. 3

GROUND CIRCUIT APPARATUS FOR ELECTRONIC EQUIPMENT

BACKGROUND OF THE INVENTION

1. Field of the Invention

This invention relates to a ground circuit apparatus for electronic equipment and, more specifically, to a ground circuit apparatus for electronic equipment having a plurality of circuit blocks, such as a video tape recorder, a television and audio equipment.

2. Description of the Related Art

In a conventional camera-incorporated video tape recorder (hereafter referred to as a VTR), a camera circuit, a logic circuit, a video circuit and an audio circuit are configured independently and a substrate having those circuits attached thereto is installed on a mount called a mechanical deck. FIG. 1 is a block diagram of a ground circuit apparatus of a conventional camera-incorporated VTR. Power is supplied either from battery output terminal 12 or AC adapter output terminal 14. A DC power of +10V, for example, is supplied by selecting either of the two power sources with switch 16 to DC-DC converter 18 and regulators 20, 22 and 24 through the power line indicated by +B in the diagram. After converting the input DC power to a specified DC voltage, DC-DC converter 18 supplies the power to the individual circuits of signal processing circuit group 36 composed of camera circuit 26, logic circuit 28, servo circuit 30, video circuit 32 and audio circuit 34.

Regulator 20 regulates the input DC power and supplies the power to microcomputer 38. Regulator 22, which serves the motors, regulates the input DC power and supplies it to motor driving circuit group 46 constituting of drum motor 40, loading motor 42 and capstan motor 44. Regulator 24 regulates the input DC power and supplies it to electronic view finder (EVF) 48.

Let GND1 denote a ground line common to camera circuit 26, logic circuit 28, servo circuit 30, video circuit 32 and audio circuit 34 and also a ground circuit for regulator 20 and microcomputer 38 (indicated by the dotted lines in the diagram). Let GND2 denote a ground line for drum motor 40, loading motor 42 and capstan motor 44. Then, GND1 is connected with GND2 through DC-DC converter 18 and regulators 22 and 24. Chassis 50 is connected with the ground line GND1 through the ground line GND3 of video circuit 32. As shown in FIG. 1, there are provided additional ground lines between the adjacent circuits, that is, between camera circuit 26, logic circuit 28, servo circuit 30, video circuit 32, audio circuit 34 and microcomputer 38. Likewise, ground lines are provided between drum motor 40 and loading motor 42, and between loading motor 42 and capstan motor 44.

The ground lines of the two circuit groups 36 and 46 are connected through DC-DC converter 18 and regulators 22 and 24. Within the respective circuit groups, that is, within signal processing circuit group 36 and within motor driving circuit group 46, a loop is formed by the respective ground lines. Two ground lines are sometimes connected, and sometimes not connected for such a reason as electromagnetic induction is more likely to occur by connection. To take an example, when a connection is made directly on the load-applied ends between GND1, the ground line of camera circuit 26, logic circuit 28, servo circuit 30, video circuit 32 and audio circuit 34 in signal processing circuit group 36 and GND2, the ground line of drum motor 40, loading motor 42, and capstan motor 44 in motor driving circuit group 46, a leak of motor noise into signal processing circuit group 36, through the ground line increases because the current following into the motors increases considerably in an instant when motors are started. Thus this adversely affects signal processing circuit group 36, in which video circuit 32 and audio circuit 34 are most affected.

Therefore, as shown in FIG. 1, GND1 and GND2 are generally not connected directly on the load-applied ends. In consequence, the ground line GND1, as well as ground line GND2, is connected directly to chassis 50, and GND1 is connected to the ground line GND2 through DC-DC converter 18, with the result that the ground line route from GND2 to chassis 50 is considerably long.

In some types of VTRs, a portion of the circuit using the ground line GND2 group (including GND2) is sometimes led to the outside of the VTR. Further, since EVF 48 consumes a considerable amount of current, and noise occurs in each horizontal period or vertical period, the power source to EVF 48 is separated from the power source to signal processing circuit group 36 and a ground line of EVF 48 is also provided on the side of the ground line GND2 as illustrated in the diagram. In such a case, the video signal line, the power line and the ground line GND2 are, in some cases, collectively led through an external connection terminal to the outside of the VTR.

In a VTR having such a ground circuit apparatus, when static electricity, accumulated on the human body, for example, is discharged to the ground terminal of EVF 48 of the ground line GND2 group, the charge flows through the ground line GND2, passes through the ground line GND1 connected to DC-DC converter 18 and is discharged through the ground line GND3 of video circuit 32 to chassis 50. However, the ground line route from the ground line GND2 through GND1 and GND3 to chassis 50 is considerably long. Consequently, when the discharge of static electricity is generated, the signal processing block tends to be affected by noises. Therefore, there is a concern that the VTR may malfunction and the ICs in the signal processing block may break down.

To be more specific, when discharge of static electricity is generated on the ground terminal of the EVF of a camera-incorporated VTR which is a part of the long ground line GND2 connected to chassis 50, there is conventionally a possibility that the ICs of the signal processing block connected to the ground line break down or malfunction before the discharged charge passes through the long ground line and is discharged to chassis 50.

To solve those problems, if the ground line GND2 and chassis 50 are connected by a short circuit on the load-applied ends, noise is induced from drum motor 40, loading motor 42 and capstan motor 44 of motor group 36 and EVF 48 through the ground line to camera circuit 26, logic circuit 28, servo circuit 30, video circuit 32 and audio circuit 34 of signal processing circuit group 36 and microcomputer 33. This gives rise to a problem of deterioration of the VTR equipment.

SUMMARY OF THE INVENTION

The object of this invention is to provide a ground circuit apparatus for electronic equipment, which is capable of discharging static electricity with no malfunctioning of the electronic equipment and no destruction or deterioration of the ICs, and which is also capable of preventing interference among the circuits.

According to an aspect of the present invention, there is provided a ground circuit apparatus for electronic equipment comprising a first electronic circuit means having a tendency to generate noise, a first signal line for supplying a first signal and a second signal line for returning the first signal supplied by the first signal line, the first and second signal lines being coupled to the first electronic circuit means, a second electronic circuit means coupled to a signal line different from the first and second signal lines but not directly coupled t the first electronic circuit means, a third signal line for supplying a second signal and a fourth signal line for returning the second signal supplied by the third signal line, the third and fourth signal lines being coupled to the second electronic circuit means and different from the first and second signal lines, a chassis means coupled to the second electronic circuit means and serving as a reference potential point, and conducting means capable of conduction at a specified voltage.

BRIEF DESCRIPTION OF THE DRAWINGS

These and other features and advantages of the present invention will become more apparent from the following detailed description of an exemplary embodiment, as illustrated in the accompanying drawings in which:

FIG. 2 is a block diagram showing a ground circuit apparatus of a camera-incorporated VTR employing a ground circuit apparatus for electronic equipment according to the present invention; and FIG. 3 is a wiring diagram schematically showing the ground circuit connections for the circuit of FIG. 2.

DETAILED DESCRIPTION OF THE PREFERRED EMBODIMENT

Figure 1:
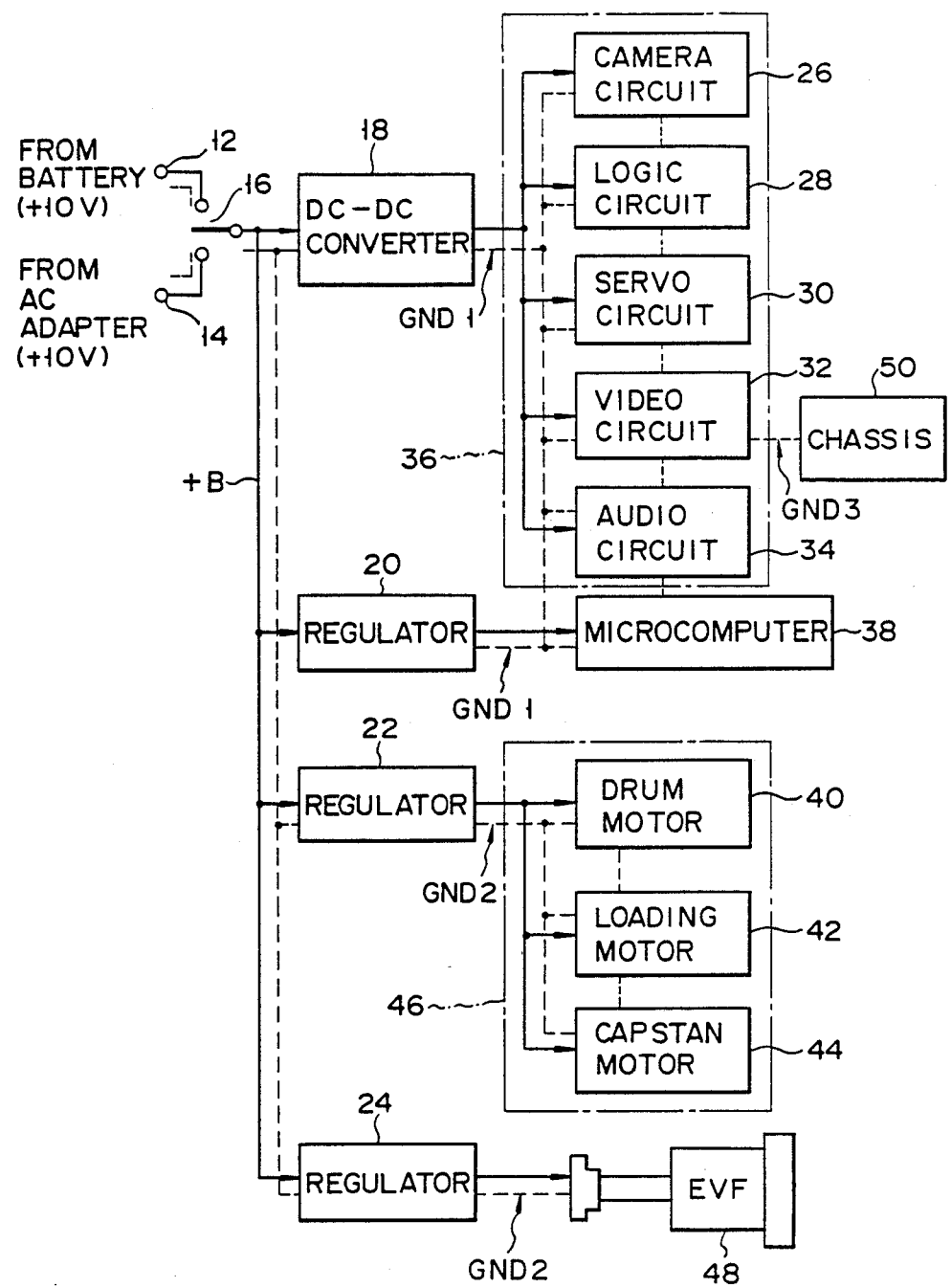
FIG. 1 is a block diagram showing an example of a ground circuit apparatus of a camera-incorporated VTR of the prior art.

An embodiment of this invention will now be described with reference to the accompanying drawings. Those parts which are the same as those of the prior art of FIG. 1 will be described using the same reference numerals.

FIG. 2 is a block diagram showing an embodiment of a ground circuit apparatus for electronic equipment a ground circuit apparatus for electronic equipment according to the present invention, which is more specifically a ground circuit apparatus for a camera incorporated VTR. Power is supplied from output terminal 12 of a battery (not shown) or from output terminal 14 of an AC adapter (not shown). For example, a DC power of +10V is supplied, by selecting either of the two power sources with switch 16, to DC-DC converter 18 and regulators 20, 22 and 24 through the power line +B indicated by the solid lines in the diagram. After converting the input DC power into a specified DC voltage, DC-DC converter 18 supplies the power to VTR signal processing circuit group 36 comprising camera circuit 26, logic circuit 28, servo circuit 30, video circuit 32 and audio circuit 34. Microcomputer 38 processes signals from signal processing circuit group 36 and constitutes a signal processing block of the VTR jointly with the circuits of signal processing circuit group 36. The DC power is supplied to microcomputer 38 through regulator 20 which regulates the DC power. GND1 denotes the ground line for microcomputer 38 and circuits 26 to 34 of signal processing circuit group 36. The ground line GND1 leading to the circuits of signal processing circuit group 36 is connected through DC-DC converter 18 to the ground line GND2 which will be described later. Also through regulator 20, the ground line GND1 of the circuits 26 to 34 of said signal processing circuit group 36 and microcomputer 38, is connected with the ground line GND2. Chassis 50 is connected with the ground line GND1 through the ground line GND3 of video circuit 32.

Drum motor 40, loading motor 42 and capstan motor 44, which constitute motor driving circuit group 46 of the VTR, receive the input DC power which has been regulated by regulator 22. Drum motor 40, loading motor 42 and capstan motor 44 are connected between them by ground lines and those motors are connected through regulator 22 with the ground line GND2 which is in turn connected with the ground line GND1.

The DC power is supplied to electronic view finder (EVF) 48 through regulator 24 which regulates the input DC power. EVF 48 is connected by the ground line GND2 through regulator 24 to DC-DC converter 18 and regulators 20 and 22. EVF 48 is connected to chassis 50 through the ground line GND4 having included therein diodes 52 and 54 in a parallel circuit. Diodes 52 and 54 are connected such that their polarities are in opposite directions.

FIG. 3 is a wiring diagram schematically showing the ground circuit connections for the circuits of the camera-incorporated VTR of FIG. 2. In this case, camera circuit 26 is divided into first and second camera circuits 26a and 26b which are mounted respectively on first and second camera circuit boards 56a and 56b. First and second camera circuit boards 56a and 56b are connected to DC-DC converter 18 by the ground line GND1 employing connectors, cables or jumper wires, or the like.

Logic circuit 28 and servo circuit 30 are mounted on first mother substrate 60. In this case, it is assumed that microcomputer 38 is included in logic circuit 28. The other parts mounted on first mother substrate 60 include regulators 20, 22 and 24 and motor control circuit 58 of motor driving circuit group 46 composed of drum motor 40, loading motor 42 and capstan motor 44, as well as the parallel circuit, which includes diodes 52 and 54. Logic circuit 28 including microcomputer 38 and servo circuit 30 re connected by the ground line GND1 to DC-DC converter 18. Regulators 20, 22 and 24, motor control circuit 58 and one end of the parallel circuit including diodes 52 and 54 are connected through the ground line GND2 to DC-DC converter 18. Connectors, cables or jumper wires, or the like, are used in this connection with the ground line GND2 in the same manner as in the connection with the ground line GND1.

Video circuit 32 and audio circuit 34 in signal processing circuit group 36 are mounted on second mother substrate 62 and connected through the ground line GND1 to DC-DC converter 18. Video circuit 32 is connected by the ground line GND3 (the grounding terminal of the substrate, by screwing down, or the like) to metal chassis 50, which may be a die casting. Chassis 50 is connected by the ground line GND4, using a jumper line or the like, to the other end of the parallel circuit including diodes 52 and 54 on first mother substrate 60. EVF 48 is connected by the ground line GND2 with DC-DC converter 18. The ground line GND2 is designed to be connectable to another circuit (not shown).

The operation of the embodiment of this invention will be described in the following.

DC power is supplied either from output terminal 12 or 14 of a battery power source or an AC adapter via switch 16 to DC-DC converter 18 and regulators 20, 22 and 24. DC-DC converter 18 converts the input DC power to a specified voltage and supplies the power to signal processing circuit group 36 and more specifically to camera circuit 26, logic circuit 28, servo circuit 30, video circuit 32 and audio circuit 34.

Regulator 20 regulates the input DC power and supplies it to microcomputer 38. Regulator 22 for the motors, after regulating the input DC power, supplies it to drum motor 40, loading motor 42 and capstan motor 44 in motor driving circuit group 46. Likewise, regulator 24 regulates the input DC power and supplies it to EVF 48.

The ground circuits on the load-applied ends will now be described. As shown in FIG. 3, camera circuit 26 (first and second camera circuits 26a and 26b), logic circuit 28, servo circuit 30 and audio circuit 34 of signal processing circuit group 36 are connected to chassis 50 through the ground line GND1 of first or second mother substrate 60 or 62 and the ground line GND3. Video circuit 32 is connected to chassis 50 only through the ground line GND3.

On the other hand, motor control circuit 58 constituted of regulators 20, 22 and 24 and motor control circuit for drum motor 40, loading motor 42 and capstan motor 44, and EVF 48 are connected to chassis 50 through the ground line GND2, via a parallel circuit of diodes 52 and 54 and then through the ground line GND4.

Thus, the ground lines GND1 and GND2 are connected, on the load-applied ends, only through GND4 and via diodes 52 and 54. Diodes 52 and 54 each have a forward voltage of about 0.6V. Noise that occurs in motor driving circuit group 46 (motor control circuit 58) or EVF 48 does not exceed 0.6V. Therefore, when noise occurs in motor driving circuit group 46 or EVF 48, the noise is intercepted by diodes 52 and 54. Thus, the noise is prevented from leaking through chassis 50 into the ground line GND1.

When static electricity accumulated on the human body is discharged into the ground line GND2 via the ground terminal of EVF 48, for example, the static charge is short-circuited and discharged to chassis 50 through the ground line GND4 and diode 52 or 54. This prevents the charge from being discharged through DC-DC converter 18, the ground line GND1 and video circuit 32 to chassis 50.

Therefore, when static electricity is discharged on the ground line GND2, the charge is short-circuited to chassis 50 through diode 52 or 54, thereby preventing the charge from passing through the ground line GND1. Consequently, it is possible to prevent the malfunctioning of the VTR, and the destruction or performance deterioration of the IC devices.

Furthermore, due to the forward voltage applied to diodes 52 and 54, the load-applied ends of the ground lines GND1 and GND2 are not short-circuited as a matter of fact, with respect to noise lower than 0.6V. Since, therefore, signal processing circuit group 36 is kept free from adverse effects caused by noise, the performance of the VTR is prevented from deteriorating.

What is claimed is:

1. A ground circuit apparatus for electronic equipment comprising:
   first electronic circuit means having a tendency to generate noise;
   a first signal line for supplying a first signal and a second signal line for returning the first signal supplied by said first signal line, said first and second signal lines being coupled to said first electronic circuit means;
   a second electronic circuit means coupled to a signal line different from said first and second signal lines but not directly coupled to said first electronic circuit means;
   a third signal line for supplying a second signal and a fourth signal line for returning the second signal supplied by said third signal line, said third and fourth signal lines being coupled to said second electronic circuit means and different from said first and second signal lines;
   a chassis means coupled to said second electronic circuit means and serving as a reference potential point; and
   conducting means coupled between said chassis mean and said first electronic circuit means and capable of conduction at a specified voltage.

2. An apparatus according to claim 1, wherein said conducting means has a circuit having two diodes, which are connected in parallel and are directed in mutually opposite directions to have opposite polarities, and two terminals.

3. An apparatus according to claim 2, further comprising a fifth signal line for signal return, which couples said first electronic circuit means to one of said two terminals of said circuit having said two diodes which are connected in parallel and are directed in mutually opposite directions to have opposite polarities, and a sixth signal line for signal return, which couples said chassis means to the other terminal of said circuit having said two diodes.

4. An apparatus according to claim 1, wherein said second electronic circuit means is constituted by a signal processing circuit which must reject an inroad of the noise generated at said first electronic circuit means.

5. An apparatus according to claim 1, wherein said electronic circuit means includes a motor control circuit.

* * * * *